(No Model.)
E. G. HOLDEN.
BOLT FASTENER.
No. 330,119. Patented Nov. 10, 1885.
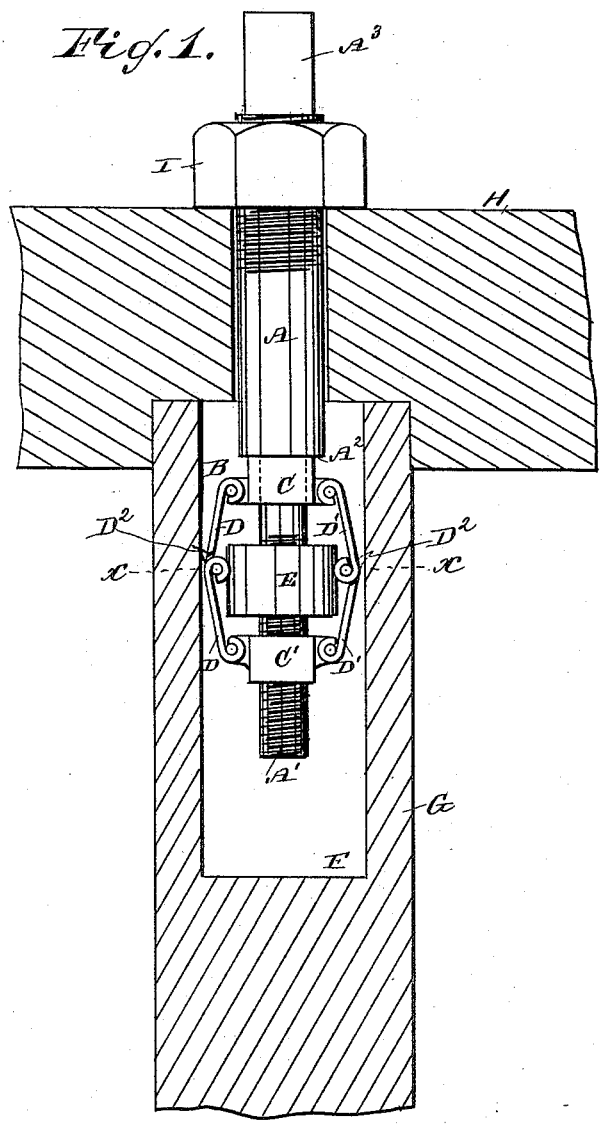
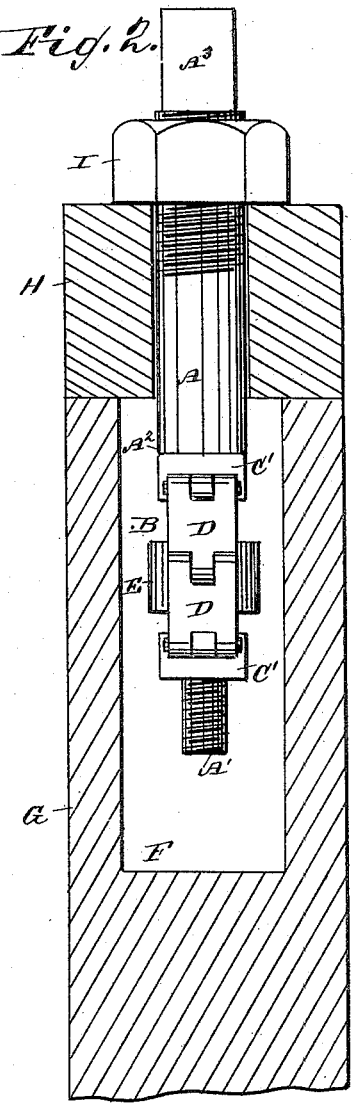
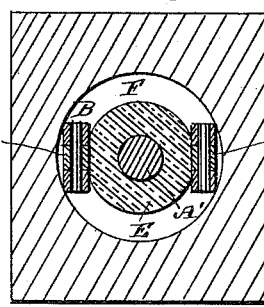
WITNESSES:
Theo. G. Hoster
C. Sedgwick
INVENTOR:
E. G. Holden
BY Munn & Co
ATTORNEYS.

UNITED STATES PATENT OFFICE.

EDWARD GWYNN HOLDEN, OF OAK RIDGE, MISSOURI.

BOLT-FASTENER.

SPECIFICATION forming part of Letters Patent No. 330,119, dated November 10, 1885.

Application filed June 30, 1885. Serial No. 170,316. (No model.)

*To all whom it may concern:*

Be it known that I, EDWARD GWYNN HOLDEN, of Oak Ridge, in the county of Cape Girardeau and State of Missouri, have invented a new and Improved Bolt-Fastener, of which the following is a full, clear, and exact description.

The object of my invention is to provide a new and improved bolt-fastener which securely holds the bolt in a smooth recess.

The invention consists of a bolt, provided with toggle-joints, and of various parts and details hereinafter more fully set forth and claimed.

Reference is to be had to the accompanying drawings, forming part of this specification, in which similar letters of reference indicate corresponding parts in all the figures.

Figure 1 is a front elevation of the bolt-fastener securing two bars together, which bars are shown in section. Fig. 2 is an end view of the same, and Fig. 3 is a horizontal cross-section on the line $x\,x$ of Fig. 1.

The bolt A is provided on one end with the bolt A', which is less in diameter than the bolt A, forming the shoulder $A^2$. The toggle-joint B consists of the end piece C, which fits loosely on the bolt A', the end piece C', which is provided with screw-threads and acts as a nut on the threaded part of the bolt A', and the joints D and D', which connect the pieces C and C' jointly together. A piece of rubber, E, is placed on the bolt A', between the end pieces C and C', to prevent the joints D and D' from closing inwardly.

The end piece C rests against the shoulder $A^2$, and the end piece C' screws on the bolt A', so that when this device is placed in the recess F of a beam, G, for instance, as shown in the drawings, and the bolt A is turned from right to left, it screws the end piece C' up toward the stationary end piece C, forcing thereby the joints D and D' outwardly against the inner faces of the recess F, and holding the bolt securely in the recess F on the beam G. A cross-beam, H, having an aperture of the same diameter as the bolt A, can then be placed on the beam G and secured to the same by the bolt A and nut I.

The bolt A is generally provided with a square offset, $A^3$, on the opposite end from bolt A', so as to use a wrench or other device to turn the bolt A when screwing up the toggle-joint.

When turning the bolt A from left to right, the toggle-joint B is unscrewed and the bolt A can be removed.

A pointed projection, $D^2$, (shown in dotted lines in Fig. 1,) may be placed at the joint of the joint-arms D D', so as to add additional security in fastening the bolt A in the recess F of the beam G.

Having thus fully described my invention, I claim as new and desire to secure by Letters Patent—

1. The bolt A, having the reduced threaded portion A' forming the shoulder $A^2$, in combination with the end pieces C and C' and the toggle-levers D and D', substantially as shown and described.

2. The bolt A, provided with the reduced threaded portion A', forming the shoulder $A^2$, and with the square offset $A^3$, in combination with the end pieces C and C', the toggle-levers D and D', having pointed projections, and the rubber piece E, substantially as shown and described.

EDWARD GWYNN HOLDEN.

Witnesses:
  R. W. HARRIS,
  C. D. McCALLISTRE.